(12) United States Patent
High et al.

(10) Patent No.: US 12,076,864 B2
(45) Date of Patent: *Sep. 3, 2024

(54) DISTRIBUTED AUTONOMOUS ROBOT INTERFACING SYSTEMS AND METHODS

(71) Applicant: Walmart Apollo, LLC, Bentonville, AR (US)

(72) Inventors: Donald High, Noel, MO (US); David Winkle, Leesburg, FL (US); Brian Gerard McHale, Chadderton Oldham (GB); Todd Davenport Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,000

(22) Filed: Jun. 20, 2023

(65) Prior Publication Data

US 2023/0347511 A1    Nov. 2, 2023

Related U.S. Application Data

(63) Continuation of application No. 17/532,603, filed on Nov. 22, 2021, now Pat. No. 11,707,839, which is a
(Continued)

(51) Int. Cl.
*B25J 9/16* (2006.01)
*B25J 5/00* (2006.01)
(Continued)

(52) U.S. Cl.
CPC ............... *B25J 9/163* (2013.01); *B25J 5/00* (2013.01); *B25J 9/1612* (2013.01);
(Continued)

(58) Field of Classification Search
CPC ............. B25J 9/163; B25J 5/00; B25J 9/1612
See application file for complete search history.

(56) References Cited

U.S. PATENT DOCUMENTS 5,280,431 A  * 1/1994  Summerville ....... G05D 1/0282
                                                            700/255
5,668,630 A    9/1997  Bilodeau
(Continued)

FOREIGN PATENT DOCUMENTS

GB          2572931          10/2019
GB          2573707          11/2019
(Continued)

OTHER PUBLICATIONS

US 8,204,524 B2, 06/2012, Zini (withdrawn)
(Continued)

*Primary Examiner* — Kyle O Logan
(74) *Attorney, Agent, or Firm* — Fitch, Even, Tabin & Flannery LLP

(57) ABSTRACT

Described in detail herein is an automated fulfillment system including a computing system programmed to receive requests from disparate sources for physical objects disposed at one or more locations in a facility. The computing system can combine the requests, and group the physical objects in the requests based on object types or expected object locations. Autonomous robot devices can receive instructions from the computing system to retrieve a group of the physical objects and deposit the physical objects in storage containers.

19 Claims, 8 Drawing Sheets

Related U.S. Application Data continuation of application No. 15/880,708, filed on Jan. 26, 2018, now Pat. No. 11,179,845.

(60) Provisional application No. 62/452,118, filed on Jan. 30, 2017.

(51) Int. Cl.
 *G05B 19/12* (2006.01)
 *G05B 19/418* (2006.01)
 *G05B 23/02* (2006.01)
 *G05D 1/00* (2006.01)

(52) U.S. Cl.
 CPC ....... *G05B 19/124* (2013.01); *G05B 19/4185* (2013.01); *G05B 19/4189* (2013.01); *G05B 23/0289* (2013.01); *G05D 1/0027* (2013.01); *G05D 1/0088* (2013.01); *G05B 2219/23363* (2013.01); *G05B 2219/31006* (2013.01); *G05B 2219/31454* (2013.01); *G05B 2219/32037* (2013.01); *G05B 2219/40507* (2013.01); *Y02P 90/02* (2015.11); *Y10S 901/01* (2013.01); *Y10S 901/47* (2013.01)

(56) References Cited

U.S. PATENT DOCUMENTS

| | | | |
|---|---|---|---|
| 5,911,767 A * | 6/1999 | Garibotto | G01S 5/16 701/28 |
| 6,535,793 B2 | 3/2003 | Allard | |
| 6,584,375 B2 | 6/2003 | Bancroft | |
| 7,353,954 B1 | 4/2008 | Malek | |
| 7,516,848 B1 | 4/2009 | Shakes | |
| 7,693,757 B2 | 4/2010 | Zimmerman | |
| 7,894,939 B2 | 2/2011 | Zini | |
| 8,032,249 B1 * | 10/2011 | Shakes | B07C 5/38 700/214 |
| 8,204,624 B2 | 6/2012 | Zini | |
| 8,594,834 B1 | 11/2013 | Clark | |
| 8,892,241 B2 | 11/2014 | Weiss | |
| 9,050,723 B1 * | 6/2015 | Elazary | B25J 9/163 |
| 9,120,622 B1 | 9/2015 | Elazary | |
| 9,129,251 B2 | 9/2015 | Davidson | |
| 9,205,886 B1 | 12/2015 | Hickman | |
| 9,230,387 B2 | 1/2016 | Stiernagle | |
| 9,262,141 B1 | 2/2016 | Orofino, II | |
| 9,262,741 B1 | 2/2016 | Williams | |
| 9,327,397 B1 | 5/2016 | Williams | |
| 9,367,830 B2 | 6/2016 | Keller | |
| 9,409,664 B1 | 8/2016 | Vliet | |
| 9,457,468 B1 * | 10/2016 | Elazary | B25J 9/161 |
| 9,785,911 B2 | 10/2017 | Galluzzo | |
| 10,189,642 B2 | 1/2019 | High | |
| 10,339,411 B1 | 7/2019 | Hua | |
| 10,494,180 B2 | 12/2019 | High | |
| 10,520,353 B1 | 12/2019 | Shi | |
| 10,591,348 B1 | 3/2020 | Shi | |
| 10,614,274 B2 | 4/2020 | High | |
| 10,625,941 B2 | 4/2020 | High | |
| 11,179,845 B2 | 11/2021 | High | |
| 11,707,839 B2 | 7/2023 | High | |
| 2005/0238465 A1 | 10/2005 | Razumov | |
| 2006/0206235 A1 * | 9/2006 | Shakes | B65G 1/1378 700/216 |
| 2007/0098264 A1 | 5/2007 | Van Lier | |
| 2008/0077511 A1 | 3/2008 | Zimmerman | |
| 2010/0066497 A1 | 3/2010 | Lim | |
| 2010/0114363 A1 | 5/2010 | Cardoni | |
| 2012/0330458 A1 * | 12/2012 | Weiss | B66F 9/063 901/1 |
| 2013/0145299 A1 * | 6/2013 | Steimle | G16H 10/40 715/771 |
| 2013/0238111 A1 * | 9/2013 | Whipple | B24B 49/12 700/110 |
| 2013/0262251 A1 | 10/2013 | Wan | |
| 2013/0317642 A1 | 11/2013 | Asaria | |
| 2014/0017048 A1 * | 1/2014 | Mattern | B25J 9/0084 414/730 |
| 2014/0025198 A1 * | 1/2014 | Mattern | B25J 9/1697 700/228 |
| 2014/0058556 A1 * | 2/2014 | Kawano | G05D 1/0297 701/2 |
| 2014/0088764 A1 | 3/2014 | Naidu | |
| 2014/0088939 A1 | 3/2014 | Garant | |
| 2014/0095009 A1 * | 4/2014 | Oshima | G05D 1/0238 901/1 |
| 2014/0095350 A1 | 4/2014 | Carr | |
| 2014/0136255 A1 * | 5/2014 | Grabovski | G06Q 10/063114 705/7.14 |
| 2014/0152507 A1 | 6/2014 | McAllister | |
| 2014/0180479 A1 | 6/2014 | Argue | |
| 2014/0244026 A1 * | 8/2014 | Neiser | B65G 1/1378 700/216 |
| 2014/0257553 A1 | 9/2014 | Shakes | |
| 2014/0279294 A1 | 9/2014 | Field-Darragh | |
| 2014/0350717 A1 | 11/2014 | Dagle | |
| 2014/0351101 A1 * | 11/2014 | Danelski | G06Q 30/06 705/28 |
| 2014/0365258 A1 * | 12/2014 | Vestal | G16H 40/20 901/1 |
| 2015/0032252 A1 * | 1/2015 | Galluzzo | B25J 15/0085 700/218 |
| 2015/0067080 A1 | 3/2015 | Cho | |
| 2015/0073589 A1 * | 3/2015 | Khodl | B65G 1/1378 700/218 |
| 2015/0134174 A1 * | 5/2015 | Preece | H01M 10/44 701/22 |
| 2015/0217449 A1 * | 8/2015 | Meier | G05D 1/0033 901/1 |
| 2015/0332213 A1 * | 11/2015 | Galluzzo | B25J 9/162 700/218 |
| 2015/0356648 A1 | 12/2015 | Baryakar | |
| 2015/0360865 A1 | 12/2015 | Massey | |
| 2016/0021178 A1 * | 1/2016 | Liu | H04L 41/06 370/216 |
| 2016/0082589 A1 | 3/2016 | Skrinde | |
| 2016/0148303 A1 | 5/2016 | Carr | |
| 2016/0167227 A1 | 6/2016 | Wellman | |
| 2016/0176638 A1 * | 6/2016 | Toebes | B66F 9/06 701/25 |
| 2016/0221187 A1 | 8/2016 | Bradski | |
| 2016/0236867 A1 | 8/2016 | Brazeau | |
| 2016/0260049 A1 * | 9/2016 | High | H04W 4/40 |
| 2016/0304280 A1 | 10/2016 | Elazary | |
| 2016/0314514 A1 | 10/2016 | High | |
| 2016/0337291 A1 * | 11/2016 | Park | H04L 51/214 |
| 2016/0347248 A1 * | 12/2016 | Manci | G06Q 10/0631 |
| 2016/0379166 A1 | 12/2016 | Singel | |
| 2017/0024751 A1 * | 1/2017 | Montgomery, III | G06Q 30/0202 |
| 2017/0088355 A1 * | 3/2017 | Khodl | B65G 1/1375 |
| 2017/0169672 A1 | 6/2017 | Farrow | |
| 2017/0225321 A1 * | 8/2017 | Deyle | G08B 13/19647 |
| 2018/0053141 A1 * | 2/2018 | Shydo, Jr. | G06K 17/0022 |
| 2018/0075402 A1 | 3/2018 | Stadie | |
| 2018/0079081 A1 * | 3/2018 | Chen | B25J 9/0003 |
| 2018/0104829 A1 * | 4/2018 | Altman | H01M 50/271 |
| 2018/0141211 A1 | 5/2018 | Wellman | |
| 2018/0158016 A1 | 6/2018 | Pandya | |
| 2018/0215037 A1 | 8/2018 | High | |
| 2018/0215544 A1 | 8/2018 | High | |
| 2018/0215545 A1 | 8/2018 | High | |
| 2018/0215546 A1 | 8/2018 | High | |
| 2018/0218185 A1 | 8/2018 | High | |
| 2019/0119041 A1 | 4/2019 | High | |
| 2019/0188632 A1 * | 6/2019 | Galluzzo | G05D 1/0011 |

(56) References Cited

U.S. PATENT DOCUMENTS

| | | | |
|---|---|---|---|
| 2022/0080588 A1 | 3/2022 | High | |
| 2024/0004694 A1* | 1/2024 | Chachad | ............ G06F 12/0828 |

FOREIGN PATENT DOCUMENTS

| | | |
|---|---|---|
| GB | 2573902 | 11/2019 |
| GB | 2573907 | 11/2019 |
| WO | 2016014917 A1 | 1/2016 |
| WO | 2016130849 A1 | 8/2016 |
| WO | 2018140690 | 8/2018 |
| WO | 2018140694 | 8/2018 |
| WO | 2018140722 | 8/2018 |
| WO | 2018140746 A1 | 8/2018 |
| WO | 2018140770 | 8/2018 |

OTHER PUBLICATIONS

Gross, Zoe, Robotic dispensing device installed at St. Thomas hospital, The Pharmaceutical Journal, vol. 26, No. 7120, 06530655, Oct. 28, 2000 (5 pages).

Kumar, Swagat et al., Robotics-as-a-Service: Transforming the Future of Retail, http://www.tcs.com/resources/white_papers/Pages/RoboticsasService.aspx, last viewed Sep. 9, 2016 (4 pages).

Lowe's Introduces Robot Shopping Assistant, http://www.botmag.com/lowes-introduces-robot-shopping-assistant/, last viewed Sep. 9, 2016 (2 pages).

New robotic grocery store coming to Des Moine, YouTube, https://www.youtube.com/watch? v=LC-1PCu69M4, last viewed Jan. 24, 2018 (3 pages).

PCT; App. No. PCT/US2018/015386; International Preliminary Report on Patentability mailed Jul. 30, 2019; (7 pages).

PCT; App. No. PCT/US2018/015390; International Preliminary Report on Patentability mailed Jul. 30, 2019; (13 pages).

PCT; App. No. PCT/US2018/015444; International Preliminary Report on Patentability mailed Jul. 30, 2019; (8 pages).

PCT; App. No. PCT/US2018/015475; International Preliminary Report on Patentability mailed Jul. 30, 2019; (5 pages).

PCT; App. No. PCT/US2018/015514; International Preliminary Report on Patentability mailed Jul. 30, 2019; (12 pages).

Robotic Shelf Picking—IAM Robotics Automated Storage & Retrieval System (AS/RS), YouTube, https://www.youtube.com/watch?v=h9eRDyZJzSA, last viewed Jan. 24, 2018 (3 pages).

UKIPO; App. No. GB1910489.2; Examination Report mailed Sep. 10, 2021; (4 pages).

UKIPO; App. No. GB1910489.2; Intention to Grant mailed Jan. 31, 2022; (2 pages).

UKIPO; App. No. GB1910652.5; Intention to Grant mailed Aug. 27, 2021; (2 pages).

UKIPO; App. No. GB1911171.5; Intention to Grant mailed Jan. 27, 2022; (2 pages).

UKIPO; App. No. GB1911252.3; Intention to Grant mailed Dec. 10, 2021; (2 pages).

USPTO; U.S. Appl. No. 15/880,708; Final Office Action mailed Oct. 22, 2020; (13 pages).

USPTO; U.S. Appl. No. 15/880,708; Non-Final Office Action mailed Mar. 30, 2021; (7 pages).

USPTO; U.S. Appl. No. 15/880,708; Non-Final Office Action mailed Apr. 17, 2020; (10 pages).

USPTO; U.S. Appl. No. 15/880,708; Non-Final Office Action mailed Dec. 27, 2019; (10 pages).

USPTO; U.S. Appl. No. 15/880,708; Notice of Allowance mailed Jul. 22, 2021; (8 pages).

USPTO; U.S. Appl. No. 15/880,708; Notice of Allowance mailed Aug. 25, 2021; (2 pages).

USPTO; U.S. Appl. No. 17/532,603; Non-Final Rejection mailed Dec. 21, 2022; (pp. 1-6).

USPTO; U.S. Appl. No. 17/532,603; Notice of Allowance and Fees Due (PTOL-85) mailed Mar. 21, 2023; (pp. 1-8).

Written Opinion and International Search Report from related International Patent Application No. PCT/US2018/015386 issued Mar. 13, 2018 (9 pages).

Written Opinion and International Search Report from related International Patent Application No. PCT/US2018/015390 issued Apr. 6, 2018 (15 pages).

Written Opinion and International Search Report from related International Patent Application No. PCT/US2018/015444 issued Mar. 22, 2018 (10 pages).

Written Opinion and International Search Report from related International Patent Application No. PCT/US2018/015475 issued Mar. 22, 2018 (7 pages).

Written Opinion and International Search Report from related International Patent Application No. PCT/US2018/015514 issued Apr. 12, 2018 (14 pages).

* cited by examiner

DISTRIBUTED AUTONOMOUS ROBOT INTERFACING SYSTEMS AND METHODS

CROSS-REFERENCE TO RELATED PATENT APPLICATIONS

This application is a continuation of U.S. application Ser. No. 17/532,603 filed Nov. 22, 2021, which is a continuation of U.S. application Ser. No. 15/880,708 filed Jan. 26, 2018, which claims the benefit of U.S. Provisional Application No. 62/452,118 filed on Jan. 30, 2017, all of which are incorporated herein by reference in their entirety.

BACKGROUND

Autonomous computing systems can be configured to perform various tasks. While performing these tasks autonomous computing systems can experience errors.

BRIEF DESCRIPTION OF DRAWINGS

Illustrative embodiments are shown by way of example in the accompanying drawings and should not be considered as a limitation of the present disclosure.

DETAILED DESCRIPTION

Figure 1A:
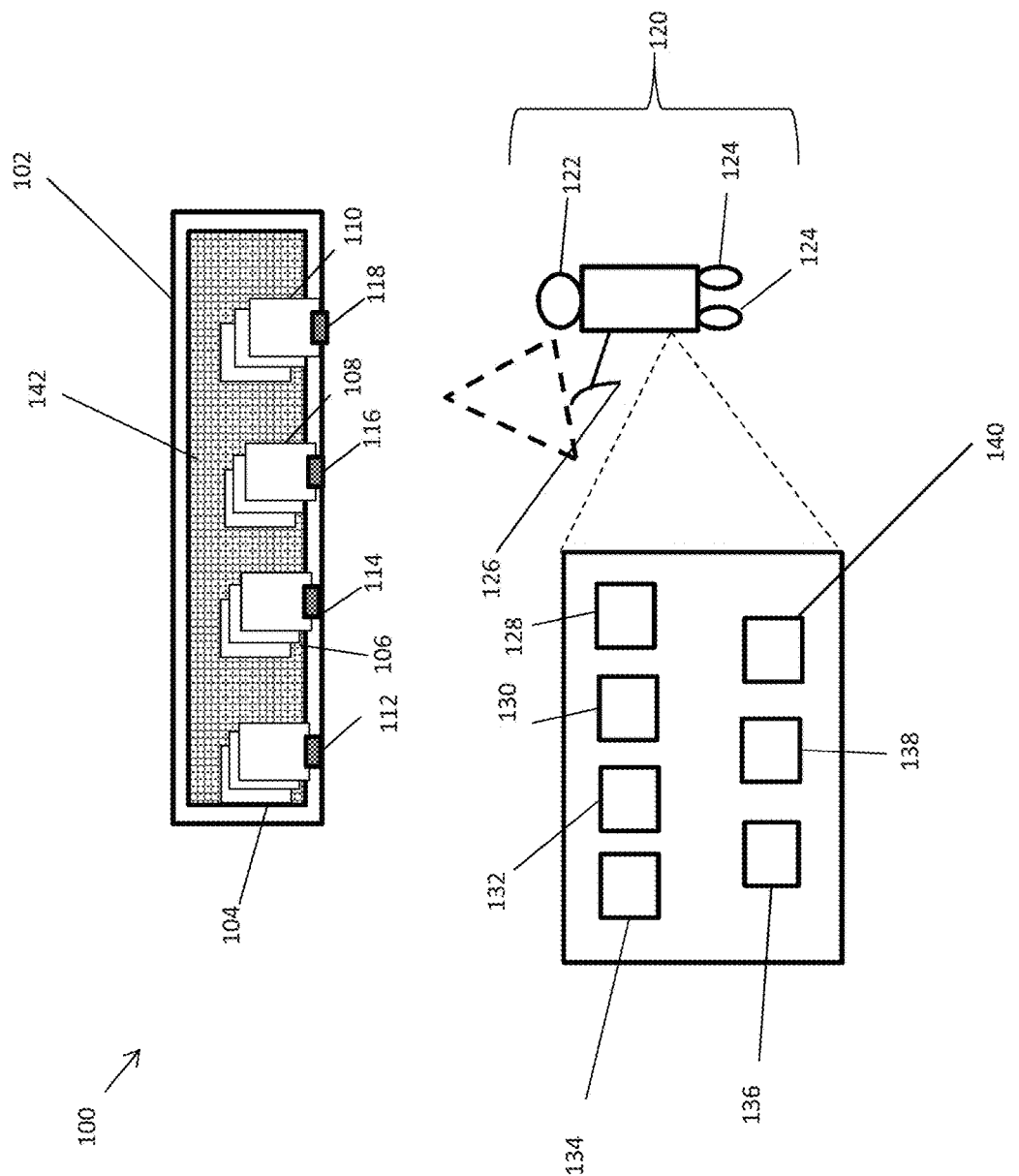
FIG. 1A is a block diagram illustrating an autonomous robot device in a facility according to exemplary embodiments of the present disclosure.

Described in detail herein is an automatic interfacing system. The system includes a plurality of autonomous robot devices which are configured to navigate a facility. A first computing system in selective communication with the plurality of autonomous robots, assigns tasks to each of the plurality of the autonomous robots in response to requests from one or more user devices. A plurality of sensors disposed throughout the facility can detect operations being performed by the plurality of autonomous robot devices. A second computing system in communication with the first computing system, the plurality of autonomous robot devices and the plurality of sensors can detect an error in at least one of the operations being performed by at least one of the plurality of autonomous robot devices based on an output of at least a subset of the plurality of sensors and a current task being performed by the at least one of the autonomous robot devices. The second computing system can establish an interface between the second computing system and the at least one autonomous robot device in response to detection of the error through which an operator communicates with the at least one autonomous robot device.

In exemplary embodiments, a plurality of autonomous robot devices are configured to navigate a facility. Each of the autonomous robot devices includes a drive system and an inertial navigation system. A first computing system in selective communication with the plurality of autonomous robots, assigns tasks to each of the plurality of the autonomous robots in response to requests from one or more user devices. A plurality of sensors disposed throughout the facility can detect operations being performed by the plurality of autonomous robot devices. A second computing system in communication with the first computing system, the plurality of autonomous robot devices and the plurality of sensors can detect an error in at least one of the operations being performed by at least one of the plurality of autonomous robot devices based on an output of at least a subset of the plurality of sensors and a current task being performed by the at least one of the autonomous robot devices. The second computing system can establish an interface between the second computing system and the at least one autonomous robot device in response to detection of the error through which an operator communicates with the at least one autonomous robot device. The at least one autonomous device comprises a controller, a drive motor, a reader, and an image capturing device.

The first computing system can further receive requests from disparate sources for physical objects disposed at one or more locations in the facility, combine the requests, and group the physical objects based on object types or expected object locations. The at least one autonomous robot devices further receives at least one the tasks from the first computing system to retrieve a first group of the physical objects, determines a first set of object locations of the physical objects in the first group autonomously retrieves the physical objects in the first group from the first set of object locations and deposits the physical objects in the first group in storage containers. Each of the storage containers corresponds to one of the requests and the at least one of the autonomous robot devices deposits the physical objects in the first group in the storage containers based on the requests to which the physical objects are associated.

The plurality of sensors can be disposed in the storage containers. The plurality of sensors detects a set of attributes associated with the physical objects deposited in the storage containers, encodes the set of attributes in electrical signals and transmits the electrical signals to the second computing systems. The second computing system receives the electrical signals, decodes the set of attributes and detects the error in at least one of the operations being performed by at least one of the plurality of autonomous robot devices, based on the set of attributes.

The error is one or more of: incorrect physical objects deposited in the storage containers, incorrect quantity of physical objects deposited in the storage containers, and damaged or decomposing physical objects deposited in the storage containers. The second computing system can control the at least one autonomous robot device, via the interface, to perform an operation in response to detecting the error in at least one of the operations being performed by at least one of the plurality of autonomous robot devices. The second computing system can control the navigation of the at least one autonomous robot device throughout the facility. The interface can include a chatroom.

FIG. 1A is a block diagram illustrating an autonomous robot device in an autonomous robot fulfillment system according to exemplary embodiments of the present disclosure. In exemplary embodiments, sets of physical objects 104-110 can be disposed in a facility 100 on a shelving unit 102, where each set of like physical objects 104-110 can be grouped together on the shelving unit 102. The physical objects in each of the sets can be associated with identifiers encoded in a machine-readable element 112-118 corresponding to the physical objects in the sets 104-110 accordingly, where like physical object can be associated with identical identifiers and disparate physical objects can be associated with different identifiers. The machine readable elements 112-118 can be bar codes or QR codes.

The autonomous robot device 120 can be a driverless vehicle, an unmanned aerial craft, automated conveying belt or system of conveyor belts, and/or the like. Embodiments of the autonomous robot device 120 can include an image capturing device 122, motive assemblies 124, a picking unit 126, a controller 128, an optical scanner 130, a drive motor 132, a GPS receiver 134, accelerometer 136 and a gyroscope 138, and can be configured to roam autonomously through the facility 100. The picking unit 126 can be an articulated arm. The autonomous robot device 120 can be an intelligent device capable of performing tasks without human control. The controller 128 can be programmed to control an operation of the image capturing device 122, the optical scanner 130, the drive motor 132, the motive assemblies 124 (e.g., via the drive motor 132), in response to various inputs including inputs from the GPS receiver 134, the accelerometer 136, and the gyroscope 138. The drive motor 132 can control the operation of the motive assemblies 124 directly and/or through one or more drive trains (e.g., gear assemblies and/or belts). In this non-limiting example, the motive assemblies 124 are wheels affixed to the bottom end of the autonomous robot device 120. The motive assemblies 124 can be but are not limited to wheels, tracks, rotors, rotors with blades, and propellers. The motive assemblies 124 can facilitate 360 degree movement for the autonomous robot device 120. The image capturing device 122 can be a still image camera or a moving image camera.

The GPS receiver 134 can be a L-band radio processor capable of solving the navigation equations in order to determine a position of the autonomous robot device 120, determine a velocity and precise time (PVT) by processing the signal broadcasted by GPS satellites. The accelerometer 136 and gyroscope 138 can determine the direction, orientation, position, acceleration, velocity, tilt, pitch, yaw, and roll of the autonomous robot device 120. In exemplary embodiments, the controller can implement one or more algorithms, such as a Kalman filter, for determining a position of the autonomous robot device.

Sensors 142 can be disposed on the shelving unit 102. The sensors 142 can include temperature sensors, pressure sensors, flow sensors, level sensors, proximity sensors, biosensors, image sensors, gas and chemical sensors, moisture sensors, humidity sensors, mass sensors, force sensors and velocity sensors. At least one of the sensors 142 can be made of piezoelectric material as described herein. The sensors 142 can be configured to detect a set of attributes associated with the physical objects in the sets of like physical objects 104-110 disposed on the shelving unit 102. The set of attributes can be one or more of: quantity, weight, temperature, size, shape, color, object type, and moisture attributes.

The autonomous robot device 120 can receive instructions to retrieve physical objects from the sets of like physical objects 104-110 from the facility 100. For example, the autonomous robot device 120 can receive instructions to retrieve a predetermined quantity of physical objects from the sets of like physical objects 104 and 106. The instructions can include identifiers associated with the sets of like physical objects 104 and 106. The autonomous robot device 120 can query a database to retrieve the designated location of the set of like physical objects 104 and 106. The autonomous robot device 120 can navigate through the facility 100 using the motive assemblies 124 to the set of like physical objects 104 and 106. The autonomous robot device 120 can be programmed with a map of the facility 100 and/or can generate a map of the first facility 100 using simultaneous localization and mapping (SLAM). The autonomous robot device 120 can navigate around the facility 100 based on inputs from the GPS receiver 228, the accelerometer 230, and/or the gyroscope 232.

Subsequent to reaching the designated location(s) of the set of like physical objects 104 and 106, the autonomous robot device 120 can use the optical scanner 130 to scan the machine readable elements 112 and 114 associated with the set of like physical objects 104 and 106 respectively. In some embodiments, the autonomous robot device 120 can capture an image of the machine-readable elements 112 and 114 using the image capturing device 122. The autonomous robot device can extract the machine readable element from the captured image using video analytics and/or machine vision.

The autonomous robot device 120 can extract the identifier encoded in each machine readable element 112 and 114. The identifier encoded in the machine readable element 112 can be associated with the set of like physical objects 104 and the identifier encoded in the machine readable element 114 can be associated with the set of like physical objects 106. The autonomous robot device 120 can compare and confirm the identifiers received in the instructions are the same as the identifiers decoded from the machine readable elements 112 and 114. The autonomous robot device 120 can capture images of the sets of like physical objects 104 and 106 and can use machine vision and/or video analytics to confirm the set of like physical objects 104 and 106 are present on the shelving unit 102. The autonomous robot device 120 can also confirm the set of like physical objects 104 and 106 include the physical objects associated with the identifiers by comparing attributes extracted from the images of the set of like physical objects 104 and 106 in the shelving unit and stored attributes associated with the physical objects 104 and 106.

The autonomous robot device 120 can pick up a specified quantity of physical objects from each of the sets of like physical objects 104 and 106 from the shelving unit 102 using the picking unit 126. The autonomous robot device 120 can carry the physical objects it has picked up to a different location in the facility 100 and/or can deposit the physical objects on an autonomous conveyor belt for transport to a different location in the store.

The sensors 142 can detect when a change in a set of attributes regarding the shelving unit 102 in response to the autonomous robot device 120 picking up the set of like physical objects 104 and 106. For example, the sensors can detect a change in quantity, weight, temperature, size, shape, color, object type, and moisture attributes. The sensors 142 can detect the change in the set of attributes in response to the change in the set of attributes being greater than a predetermined threshold. The sensors 142 can encode the change in the set of attributes into electrical signals. The sensors can transmit the electrical signals to a computing system.

Figure 1B:
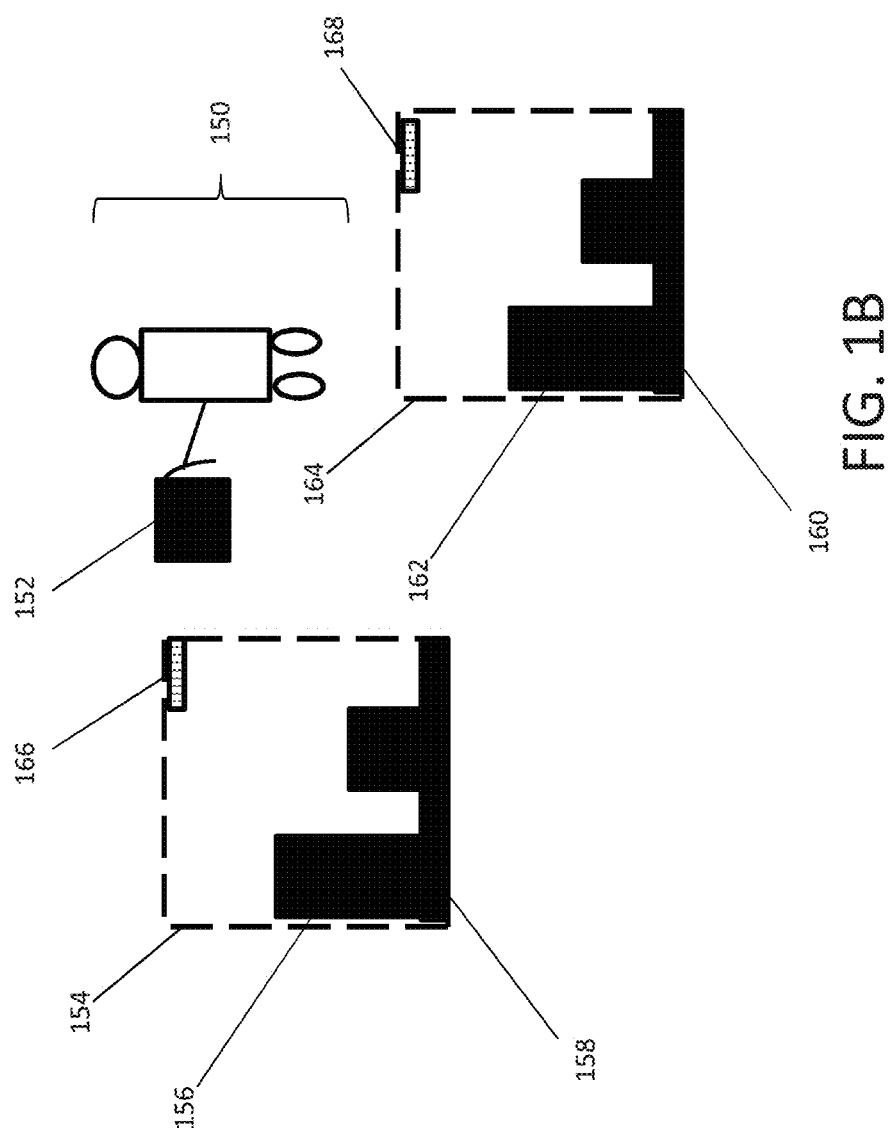
FIG. 1B is a block diagrams illustrating another autonomous robot device in an autonomous system according to exemplary embodiments of the present disclosure.

FIG. 1B is a block diagrams illustrating another autonomous robot device 150 in a facility according to exemplary embodiments of the present disclosure. As mentioned above, the autonomous robot device 150 can transport the physical objects 152 to a different location in the facility and/or can deposit the physical objects on an autonomous conveyor belt or system of conveyor belts to transport the physical objects 152 to a different location. The different location can include storage containers 154 and 164. Machine-readable elements 166 and 168 can be disposed on the storage containers 154 and 164 respectively. The machine-readable elements 166 and 168 can be encoded with identifiers associated with the storage containers 154 and 164. The storage container 154 can store physical objects 156 and the storage container 164 can store physical objects 162. The storage containers 154 and 164 can also include sensors 158 and 160, respectively, disposed in the storage containers 154 and 156 (e.g., at a base of the storage containers 154 and 156. The sensors 142 can include temperature sensors, pressure sensors, flow sensors, level sensors, proximity sensors, biosensors, image sensors, gas and chemical sensors, moisture sensors, humidity sensors, mass sensors, force sensors and velocity sensors. The physical objects 156 and 162 can be placed in proximity to and/or on top of the sensors 158 and 160. In some embodiments, at least one of the sensors 158 and 160 can be made of piezoelectric material as described herein. The sensors 158 and 160 can be configured to detect a set of attributes associated with the physical objects 156 and 162 disposed in the storage containers 154 and 164, respectively. The set of attributes can be one or more of: quantity, weight, temperature, size, shape, color, object type, and moisture attributes. The sensors can transmit the detected set of attributes to a computing system.

As mentioned above, the autonomous robot device 150 can receive instructions to retrieve physical objects 152. The instructions can also include an identifier of the storage container in which the autonomous robot device 150 should place the physical objects 152. The autonomous robot device 150 can navigate to the storage containers 154 and 164 with the physical objects 152 and scan the machine readable element 166 and 168 for the storage containers 154 and 164. The autonomous robot device 150 extract the identifiers from the machine readable elements 166 and 168 and determine in which storage container to place the physical objects 152. For example, the instructions can include an identifier associated with the storage container 154. The autonomous robot device 150 can determine from the extracted identifiers to place the physical objects 152 in the storage container 154. In another embodiment, the storage containers 154 and 164 can be scheduled for delivery. The instructions can include an address(es) to which the storage containers are being delivered. The autonomous robot device 150 can query a database to determine the delivery addresses of the storage containers 154 and 164. The autonomous robot device 150 can place the physical objects 152 in the storage container with a delivery address corresponding to the address included in the instructions. Alternatively, the instructions can include other attributes associated with the storage containers 154 and 164 by which the autonomous robot device 150 can determine the storage container 154 or 164 in which to place the physical objects 152. The autonomous robot device 150 can also be instructed to place a first quantity of physical objects 152 in the storage container 154 and a second quantity of physical objects 152 in storage container 164.

Figure 1C:
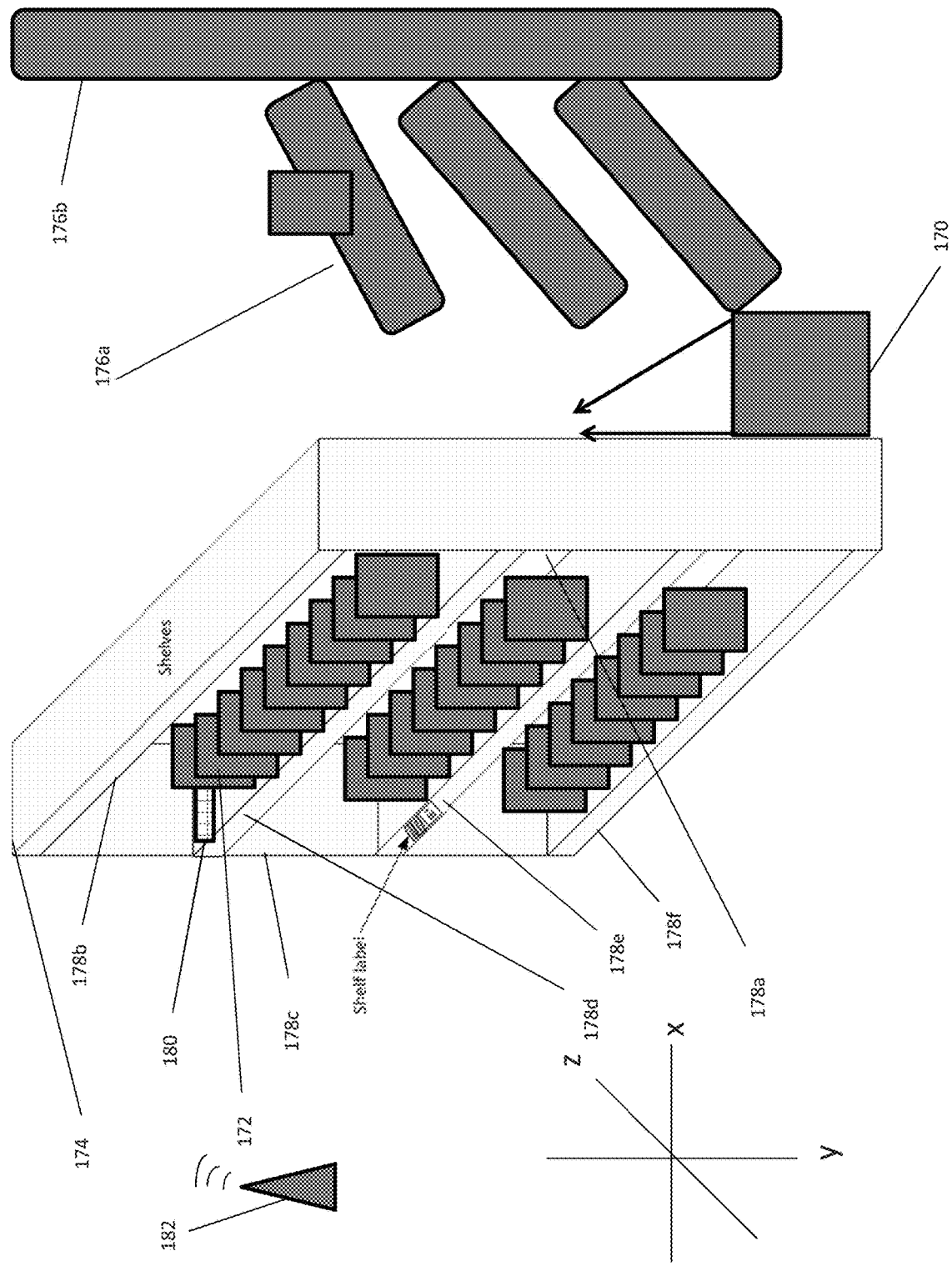
FIG. 1C illustrates a smart shelf system in accordance with an exemplary embodiment.

FIG. 1C illustrates a smart shelf system according to exemplary embodiments of the present disclosure. In some embodiments, the robotic device can be a smart shelf autonomous storage and retrieval system including an autonomous retrieval container 170 affixed to a shelving unit 174, and one or more conveyor belts 176a-b disposed behind the shelving unit 174. The conveyor belts 176a can be disposed with respect to different sections of the shelving unit 174. The conveyor belt 176b can be disposed adjacent to the conveyor belt 176a. Physical objects 172 can be disposed on the shelving unit 174. The retrieval container 170 can receive instructions to retrieve one or more physical objects from the shelving unit 174. The instructions can include the locations of the physical objects on the shelving unit 174. The autonomous retrieval container 170 can autonomously navigate along the edges 178 *a-f* of the shelving unit 174 (which can include tracks or guides) and retrieve the instructed physical objects 172 based on the locations in the instructions. The autonomous retrieval container 170 can navigate along the x and y axis. The autonomous retrieval container 170 can include a volume in which to store the retrieved physical objects.

Sensors 180 can be disposed on or about the shelving unit 174. The sensors 180 can detect when a change in a set of attributes regarding the shelving unit 174 in response to the autonomous retrieval container 170 retrieving the instructed physical objects. For example, the sensors 180 can detect a change in quantity, weight, temperature, size, shape, color, object type, and moisture attributes. The sensors 180 can detect the change in the set of attributes in response to the change in the set of attributes being greater than a predetermined threshold. The sensors 180 can encode the change in the set of attributes into electrical signals. The sensors can transmit the electrical signals to a computing system.

As described herein, RFID tags can be disposed on or about the physical objects disposed on the shelving unit 174. The RFID reader 182 can detect the RFID tags disposed on or about the physical objects 172 picked up by the autonomous retrieval container in response to the RFID tags being in range of the of the RFID reader 144. The RFID reader 144 can extract the unique identifiers encoded in the RFID tags and can transmit the unique identifiers of the RFID tags to the computing system.

The autonomous retrieval container 170 can receive instructions to retrieve physical objects 172 from the shelving unit 174. The instructions can include the locations of the physical objects 172 on the shelving unit 174. The autonomous retrieval container can traverse along the edges 178a-f of the shelving unit and retrieve the physical objects. The autonomous retrieval container 170 can place the physical objects on the conveyor belt 172a disposed behind the shelving unit 174. The conveyor belts 176a can receive instructions to transport physical objects to the conveyor belt 176b disposed adjacent to the conveyor belt 176a. The conveyor belt 176b can receive instructions to transport the physical objects to a specified location in a facility such as a delivery vehicle or a loading area.

Figure 1D:
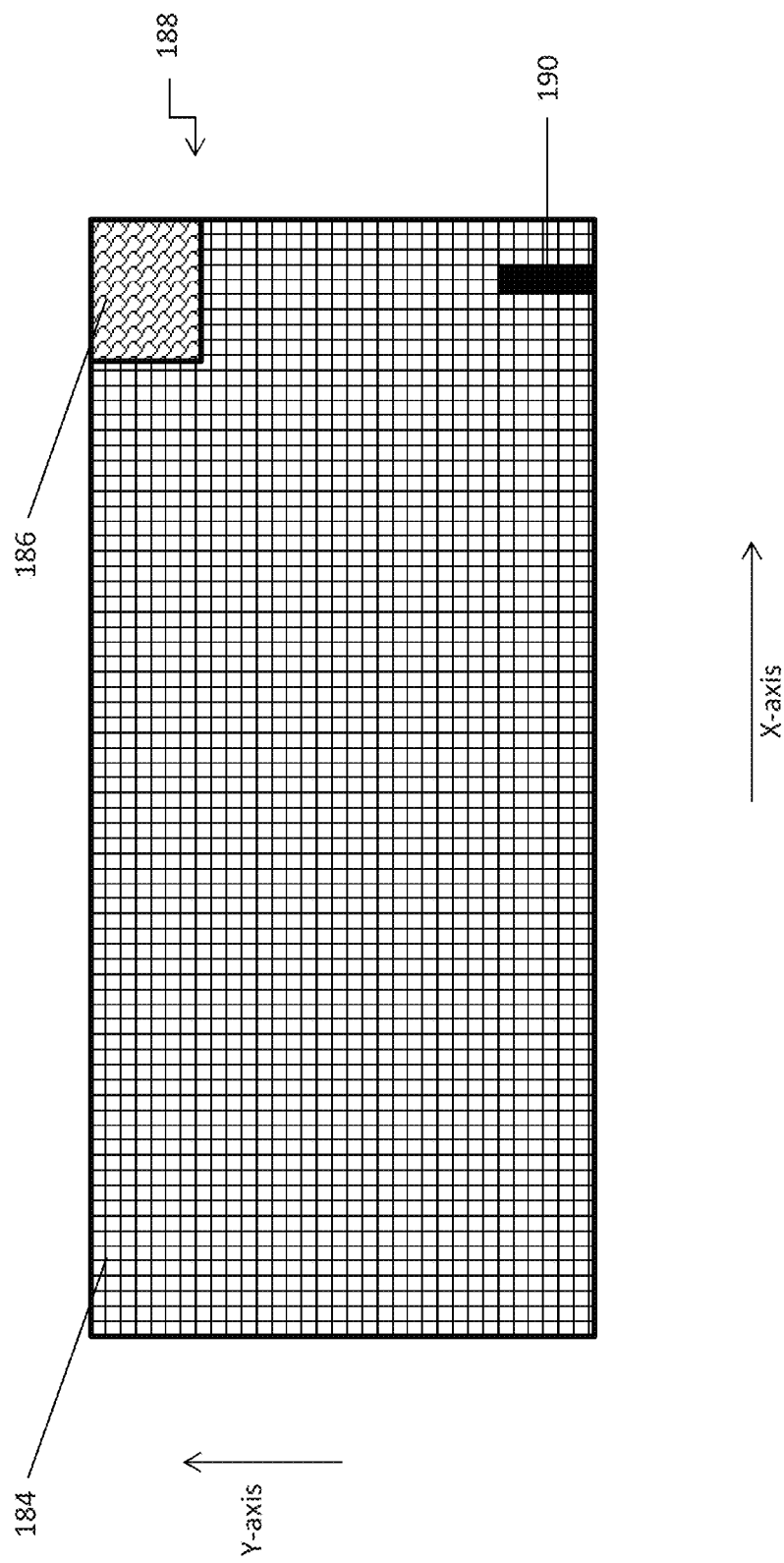
FIG. 1D illustrates an array of sensors in accordance with an exemplary embodiment.

FIG. 1D illustrates an array of sensors 188 in accordance with an exemplary embodiment. The array of sensors 188 can be disposed at the shelving units (e.g., embodiments of the shelving unit 102 and 174 shown in FIGS. 1A and 1C) and/or base of the storage containers (e.g., embodiments of the containers 154 and 164 shown in FIG. 1B). The array of sensors 188 may be arranged as multiple individual sensor strips 186 extending along the shelving units and/or base of the storage containers, defining a sensing grid or matrix. The array of sensors 188 can be built into the shelving units and/or base of the storage containers itself or may be incorporated into a liner or mat disposed at the shelving units and/or base of the storage containers. Although the array of sensors 188 is shown as arranged to form a grid, the array of sensors can be disposed in other various ways. For example, the array of sensors 188 may also be in the form of lengthy rectangular sensor strips extending along either the x-axis or y-axis. The array of sensors 188 can detect attributes associated with the physical objects that are stored on the shelving units and/or the storage containers, such as, for example, detecting pressure or weight indicating the presence or absence of physical objects at each individual sensor 184. In some embodiments, the surface of the shelving unit is covered with an appropriate array of sensors 188 with sufficient discrimination and resolution so that, in combination, the sensors 184 are able to identify the quantity, and in some cases, the type of physical objects in the storage container or shelving units.

In some embodiments the array of sensors 188 can be disposed along a bottom surface of a storage container and can be configured to detect and sense various characteristics associated with the physical objects stored within the storage container. The array of sensors can be built into the bottom surface of the tote or can be incorporated into a liner or mat disposed at the bottom surface of the mat.

The array of sensors 188 may be formed of a piezoelectric material, which can measure various characteristics, including, for example, pressure, force, and temperature. While piezoelectric sensors are one suitable sensor type for implementing at least some of the sensor at the shelving units and/or in the containers, exemplary embodiments can implement other sensor types for determine attributes of physical objects including, for example, other types of pressure/weight sensors (load cells, strain gauges, etc.).

The array of sensors 188 can be coupled to a radio frequency identification (RFID) device 190 with a memory having a predetermined number of bits equaling the number of sensors in the array of sensors 188 where each bit corresponds to a sensor 184 in the array of sensors 178. For example, the array of sensors 176 may be a 16×16 grid that defines a total of 256 individual sensors 184 may be coupled to a 256 bit RFID device such that each individual sensor 184 corresponds to an individual bit. The RFID device including a 256 bit memory may be configured to store the location information of the shelving unit and/or tote in the facility and location information of merchandise physical objects on the shelving unit and/or tote. Based on detected changes in pressure, weight, and/or temperature, the sensor 184 may configure the corresponding bit of the memory located in the RFID device (as a logic "1" or a logic "0"). The RFID device may then transmit the location of the shelving unit and/or tote and data corresponding to changes in the memory to the computing system.

Figure 2:
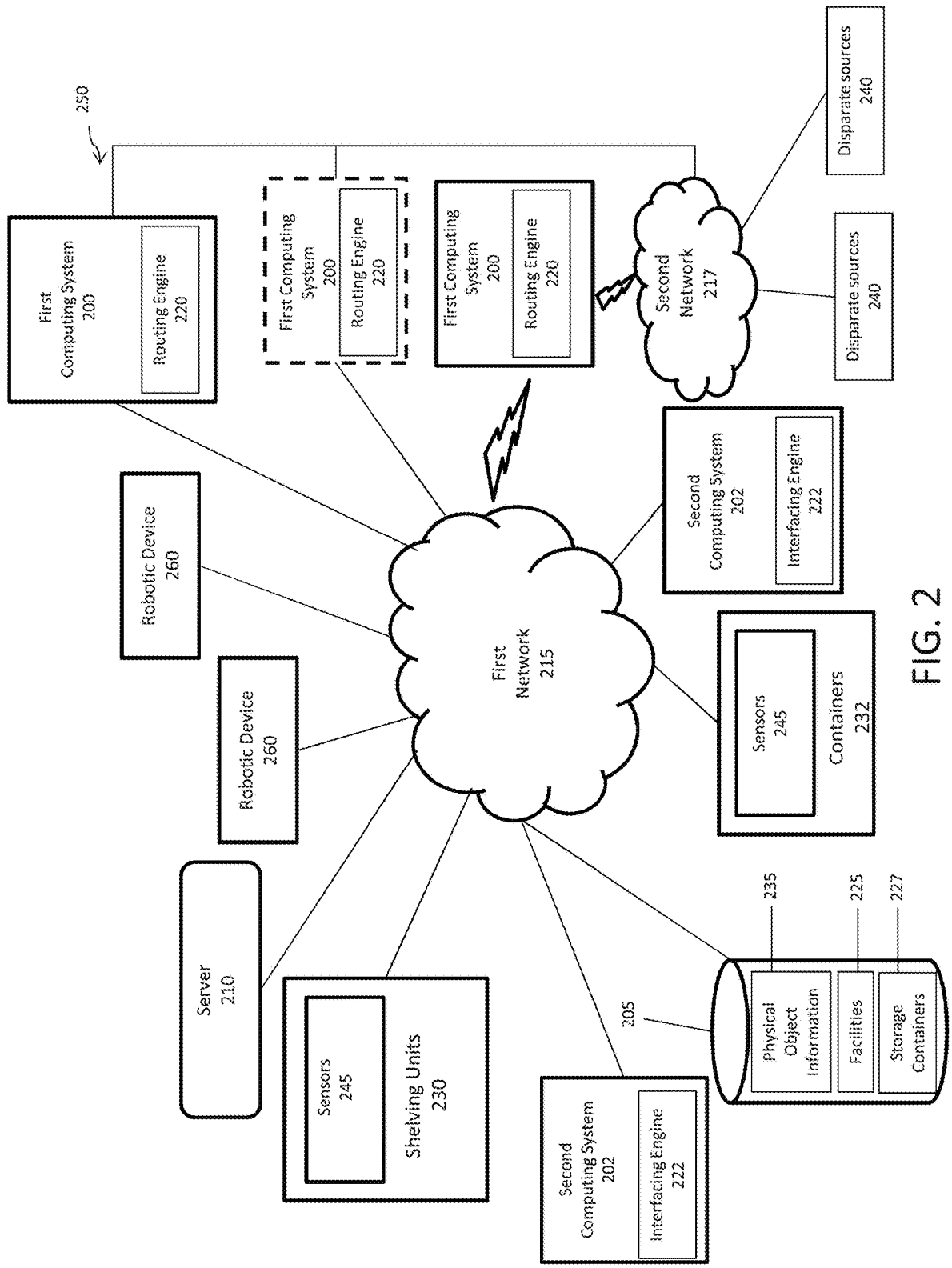
FIG. 2 is a block diagrams illustrating an automated robot interfacing system according to an exemplary embodiment.

FIG. 2 illustrates an exemplary automated robotic interfacing system 250 in accordance with an exemplary embodiment. The automated robotic interfacing system 250 can include one or more databases 205, one or more servers 210, one or more first computing systems 200, one or more second computing systems 202, sensors 245, robotic devices 260 and disparate sources 240. The sensors 245 can be an array of sensors disposed at a shelving unit 230 from which the sensors can detect attributes of the physical objects on the shelving units 230. Alternatively, the sensors 245 can be an array of sensors disposed at a bottom surface of a storage container 232 from which the sensors can detect attributes of the physical objects in the storage containers 232. In exemplary embodiments, the first computing system 200 and the second computing system 202 can be in communication with the databases 205, the server(s) 210, the sensors 245, the robotic devices, via a first communications network 215. The first computing system 200 can implement at least one instance of the routing engine 220. The second computing system 202 can implement at least one instance of the interfacing engine 222. The first computing system 200 can be in communication with disparate sources 240 via a second communications network 217.

In an example embodiment, one or more portions of the first and second communications network 215 and 217 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 210 includes one or more computers or processors configured to communicate with the first computing system 200, the second computing system 202 and the databases 205, via the first network 215. The server 210 hosts one or more applications configured to interact with one or more components computing system 200 and/or facilitates access to the content of the databases 205. In some embodiments, the server 210 can host the routing engine 220 or portions thereof. The databases 205 may store information/data, as described herein. For example, the databases 205 can include physical objects database 235, a facilities database 225 and a storage container database 227. The physical objects database 235 can store information associated with physical objects disposed at a facility and can be indexed via the decoded identifier retrieved by the identifier reader. The facilities database 225 can include information about the facility in which the physical objects are disposed. The storage container database 227 can store information to associate physical objects with storage containers 232 to identify which physical objects are to be deposited in which storage containers 232. The databases 205 and server 210 can be located at one or more geographically distributed locations from each other or from the first and second computing system 200 and 202. Alternatively, the databases 205 can be included within server 210. The disparate sources 240 can be various computing devices located at one or more geographically distributed locations from the first computing system 200 and second computing system 202.

In exemplary embodiments, the first computing system 200 can receive a request from one or more disparate sources 240 to retrieve physical objects disposed in one or more facilities. The first computing system 200 can execute the routing engine 220 in response to receiving the request to retrieve the physical objects. The routing engine 220 can query the facilities database 225 to retrieve the locations of the requested physical objects within the one or more facilities. The robotic devices 260 can use location/position technologies including LED lighting, RF beacons, optical tags, waypoints to navigate around the facility. The routing engine 220 can divide the requested physical objects into groups based one or more attributes associated with the requested physical objects. For example, the routing engine 220 can group the requested physical objects based on the proximity in location between the physical objects and create groups of physical objects with the shortest path between the locations of the physical objects. In another example, the routing engine 220 can divide the physical objects into groups based on the size of the physical objects or type of physical object. Each group can include requested physical objects from various disparate sources 240.

The routing engine 220 can assign one or more groups of requested physical object to different robotic device 260 disposed in the facility. The robotic devices 260 can receive instructions from the routing engine 220 to retrieve the one or more groups of physical objects and transport the physical objects to a location of the facility including various storage containers 232. The one or more groups of physical objects can include a predetermined quantity of physical objects from different sets of like physical objects. The instructions can include identifiers associated with the physical objects and identifiers associated with the storage containers 232. The instructions can include identifiers for various storage containers 232. The retrieved physical objects can be deposited in different storage containers 232 based on attributes associated with the physical objects. The attributes can include: a delivery address of the physical objects, size of the physical objects and the type of physical objects. The robotic devices 260 can query the facilities database 225 to retrieve the locations of the physical objects in the assigned group of physical objects. The robotic device 260 can navigate to the physical objects and scan a machine-readable element encoded with an identifier associated with each set of like physical objects. The robotic device 260 can decode the identifier from the machine-readable element and query the physical objects database 235 to confirm the robotic device 260 was at the correct location. The robotic device 260 can also retrieve stored attributes associated with the set of like physical objects in the physical objects database 235. The robotic device 260 can capture an image of the set of like physical objects and extract a set of attributes using machine vision and/or video analytics. The robotic device 260 can compare the extracted set of attributes with the stored set of attributes to confirm the set of like physical objects are same as the ones included in the instructions. The extracted and stored attributes can include, image of the physical objects, size of the physical objects, color of the physical object or dimensions of the physical objects. The types of machine vision and/or video analytics used by the routing engine 220 can be but are not limited to: Stitching/Registration, Filtering, Thresholding, Pixel counting, Segmentation, Inpainting, Edge detection, Color Analysis, Blob discovery & manipulation, Neural net processing, Pattern recognition, Barcode Data Matrix and "2D barcode" reading, Optical character recognition and Gauging/Metrology.

The robotic devices 260 can pick up a predetermined quantity of physical objects in the one or more group of physical objects and carry the physical objects to a location of the facility including storage containers 232. The storage containers 232 can have machine-readable elements disposed on the frame of the storage containers 232. The robotic devices 260 can scan the machine-readable elements of the storage containers 232 and decode the identifiers from the machine-readable elements. The robotic devices 260 can compare the decoded identifiers with the identifiers associated with the various storage containers 232 included in the instructions. The robotic devices 260 can deposit the physical objects from the one or more groups assigned to the robotic device 260 in the respective storage containers 232. For example, the robotic device 260 can deposit a first subset of physical objects from the one or more groups of physical objects in a first storage container 232 and a second subset of physical objects from one or more groups of physical objects in a second storage container 232 based on the instructions.

As mentioned above, sensors 245 can be disposed at the shelving unit 230 in which the requested physical objects are disposed. The sensors 245 disposed at the shelving unit 230 can transmit a first of attributes associated with the physical objects disposed on the shelving unit 230, encoded into electrical signals to the second computing system 202 in response to the robotic device 260 picking up the physical objects from the shelving unit 230. The sensors 245 can be coupled to an RFID device which can transmit the electrical signals to the second computing system 202. The first set of attributes can be a change in weight, temperature and moisture on the shelving unit 230. The second computing system 202 can execute the interfacing engine 222 in response to receiving the electrical signals and the interfacing engine 222 can decode the first set of attributes from the electrical signals. The interfacing engine 222 can determine an error associated with the physical objects which were picked up from the shelving unit 230 based on the first set of attributes. The error could be one or more of: incorrect physical objects, incorrect quantity of physical objects and/or damaged or decomposing physical objects deposited in the storage containers 232.

For example, the physical objects can be perishable items. The robotic device 260 can pick up the perishable items and based on the removal of perishable items, the sensors 245 disposed at the shelving unit 230, can detect a change in the moisture level. The sensors 245 can encode the change in moisture level in electrical signals and transmit the electrical signals to the second computing system 202. The second computing system 202 can execute the interfacing engine 222 in response to receiving the electrical signals. The interfacing engine 222 can decode the electrical signals and determine the perishable items picked up by the robotic device 260 are damaged or decomposing based on the detected change in moisture level. The interfacing engine 222 can establish an interface between the robotic device 260 and the interfacing engine 222. The interface can be a web-application. The interfacing engine 222 can send new instructions through the interface to the robotic device to pick up new perishable items and discard of the picked up perishable items.

The sensors 245 can also be disposed at the base of the storage containers 232. The sensors 245 disposed at the base of the storage containers 232 can encode a second set of attributes associated with the physical objects disposed in the storage containers 232 and transmit the electrical signals to the second computing system 202. The sensors 245 can be coupled to an RFID device which can transmit the electrical signals to the second computing system 202. The second computing system can execute the interfacing engine 222 in response to receiving the electrical signals. The second set of attributes can be a change in weight, temperature and moisture in the storage containers 232. The interfacing engine 222 can decode the first set of attributes from the electrical signals. The interfacing engine 222 can determine whether there was an error in the physical objects deposited in the storage containers 232 based on the second set of attributes. The error could be one or more of: incorrect physical objects deposited in the storage containers 232, incorrect quantity of physical objects deposited in the storage containers 232 and/or damaged or decomposing physical objects deposited in the storage containers 232.

For example, the sensors 245 disposed at the base of the storage containers 232 can detect an increase in weight in response to the robotic device 260 depositing an item in the storage container 232. The sensors 245 can encode the increase in weight in electrical signals and transmit the electrical signals to the second computing system 202. The second computing system 202 can execute the interfacing engine 222 in response to receiving the electrical signals.

The interfacing engine 222 can decode the electrical signals and query the storage container database 227 to determine which physical objects are designated to be deposited in the storage container 232. The interfacing engine 222 can query the physical object information database 235 to determine the weights of the physical objects designated to be deposited in the storage container 232. The interfacing engine 222 can determine an incorrect physical object was placed in the storage container 232 based on the increase in weight. The interfacing engine 222 can establish an interface with the robotic device 260 and can transmit instructions to the robotic device 260 through the interface to remove the deposited physical object from the storage container 232. The interfacing engine 222 can also transmit instructions to the robotic device through the interface 260 to deposit the physical object in a different storage container 232.

In some embodiments, the sensors 245 can be disposed throughout the facility. The sensors 245 can be RFID tags, beacons or other Near Field Communication (NFC) devices. The sensors 245 can detect as the robot devices 260 pass by the sensors 245 while the robotic device 260 is in route to pick up the physical objects from the shelving unit 230 or in route to deposit the physical objects in the storage containers 232. The sensors 245 can encode the location at which the sensors 245 detected the robotic device 260 into an electrical signal and transmit the electrical signal to the second computing system 202. The second computing system 202 can execute the interfacing engine 222 in response to receiving the electrical signal. The interfacing engine 222 can query the physical object information database 235 and/or the facilities database 225 to determine whether the robotic device 260 is in the correct route to pick up the physical objects from the shelving unit 230 or to deposit the physical objects in the storage containers 232. In response to determining the robot device is in the incorrect route to ether the shelving unit 230 or the storage containers 232, the interfacing engine 222 can establish an interface with the robot device 260. The interfacing engine 222 can re-route the robotic device 260 onto the correct path, via the interface.

In the event the autonomous robotic device 260 is embodied as a smart shelf autonomous storage and retrieval system. The autonomous robot device 260 can traverse along the edges of the shelving unit 230 and retrieve the products. The autonomous robotic device 260 can place the products on a conveyer belt disposed behind the shelving unit 230. The conveyer belts can receive instructions from the routing engine 220 to transport products to a master conveyer belt. The master conveyer belt can receive instructions to transport the products to a specified location in a facility such as a delivery vehicle or a loading area.

As a non-limiting example, the automated robotic interfacing system 250 can be implemented in a retail store and products can be disposed at the retail store. The first computing system 200 can receive instructions to retrieve products from a retail store based on a completed transaction at a physical or retail store. The first computing system 200 can receive instructions from multiple different sources. For example, the first computing system 200 can receive instructions to retrieve products for various customers. The first computing system 200 can receive the instructions to from disparate sources 240 such as a mobile device executing an instance of the retail store's mobile application or a computing device accessing the online store. The first computing system 200 can execute the routing engine 220 in response to receiving the instructions. The routing engine can query the facilities database 225 to retrieve the location of the products in the retail store and a set of attributes associated with the requested products. The routing engine 220 can divide the requested products into groups based on the locations of the products within the retail store and/or the set of attributes associated with the products. For example, the routing engine 220 can divide the products into groups based on a location of the products, the priority of the products, the size of the products or the type of the products.

The routing engine 220 can instruct the robotic devices 260 to retrieve one or more groups of products in the retails store and transport the products to a location of the facility including various storage containers 232. The one or more groups of physical objects can include a predetermined quantity of physical objects from different sets of like physical objects. The instructions can include identifiers associated with the products and identifiers associated with the storage containers 232. The instructions can include identifiers for various storage containers 232. The retrieved products can be deposited in different storage containers 232 based on attributes associated with the products. The attributes can include: a delivery address of the products, priority assigned to the products, size of the products and the type of products. The robotic devices 260 can query the facilities database 225 to retrieve the locations of the products in the assigned group of products. The robotic device 260 can navigate to the products and scan a machine-readable element encoded with an identifier associated with each set of like products. The robotic device 260 can decode the identifier from the machine-readable element and query the physical objects database 235 to confirm the robotic device 260 was at the correct location. The robotic device 260 can also retrieve stored attributes associated with the set of like products in the physical objects database 235. The robotic device 260 can capture an image of the set of like physical objects and extract a set of attributes using machine vision and/or video analytics. The robotic device 260 can compare the extracted set of attributes with the stored set of attributes to confirm the set of like products are same as the ones included in the instructions.

The robotic devices 260 can pick up the products in the group of products and transport the products to a location of the facility including storage containers 232. The storage containers 232 can have machine-readable elements disposed on the frame of the storage containers 232. The robotic devices 260 can scan the machine-readable elements of the storage containers 232 and decode the identifiers from the machine-readable elements. The robotic devices 260 can compare the decoded identifiers with the identifiers associated with the various storage containers 232 included in the instructions. The robotic devices 260 can deposit the products from the group of products assigned to the robotic device 260 in the respective storage containers 232. For example, the robotic device 260 can deposit a first subset of products from the group of physical objects in a first storage container 232 and a second subset of products from the group of physical objects in a second storage container 232 based on the instructions. In some embodiments, the robotic device 260 can determine the storage container 232 is full or the required amount of products are in the storage container 232. The robotic device 260 can pick up the storage container 232 and transport the storage container 232 to a different location in the facility. The different location can be a loading dock for a delivery vehicle or a location where a customer is located. In one example, the robotic device 260 can transfer items between them. e.g. multi-modal transport within the facility. For example, the robotic device 260 can dispense an item onto a conveyor which transfers to staging area where an aerial unit picks up for delivery. In another embodiment the robotic device 260 can be an automated shelf dispensing unit. The shelf dispensing unit can dispense the items into the storage containers. A robotic device 260 can pick up the storage containers and transport the storage containers to a location in the facility Sensors 245 can be disposed at the shelving unit 230 in which the requested products are disposed. The sensors 245 disposed at the shelving unit 230 can transmit a first of attributes associated with the products disposed on the shelving unit 230, encoded into electrical signals to the second computing system 202 in response to the robotic device 260 picking up the products from the shelving unit 230. The second computing system 202 can be a user interface on a smart device such as a smart phone or headset. The first set of attributes can be a change in weight, temperature and moisture on the shelving unit 230. For example, the change in moisture can indicate a damaged, decomposing or un-fresh perishable items (i.e. brown bananas). The second computing system 202 can execute the interfacing engine 222 in response to receiving the electrical signals and the interfacing engine 222 can decode the first set of attributes from the electrical signals. The interfacing engine 222 can determine an error associated with the products which were picked up from the shelving unit 230 based on the first set of attributes. The error could be one or more of: incorrect products, incorrect quantity of products and/or damaged or decomposing products deposited in the storage containers 232.

For example, the products can be perishable items. The robotic device 260 can pick up the perishable items and based on the removal of perishable items, the sensors 245 disposed at the shelving unit 230, can detect a change in the moisture level. The sensors 245 can encode the change in moisture level in an electrical signals and transmit the electrical signals to the second computing system 202. The second computing system can execute the interfacing engine 202 in response to receiving the electrical signals. The interfacing engine 222 can. can decode the electrical signals and determine the perishable items picked up by the robotic device 260 are damaged or decomposing based on the detected change in moisture level. The interfacing engine 222 can establish an interface between the robotic device 260 and the interfacing engine 222. The interfacing engine 222 can send new instructions through the interface to the robotic device to pick up new perishable items and discard of the picked up perishable items.

The sensors 245 can also be disposed at the base of the storage containers 232. The sensors 245 disposed at the base of the storage containers 232 can encode a second set of attributes associated with the products disposed in the storage containers 232 and transmit the electrical signals to the second computing system 202. The second computing system can execute the interfacing engine 222 in response to receiving the electrical signals. The second set of attributes can be a change in weight, temperature and moisture in the storage containers 232. The interfacing engine 222 can decode the first set of attributes from the electrical signals. The interfacing engine 222 can determine whether there was an error in the products deposited in the storage containers 232 based on the second set of attributes. The error could be one or more of: incorrect products deposited in the storage containers 232, incorrect quantity of products deposited in the storage containers 232 and/or damaged or decomposing products deposited in the storage containers 232.

For example, the sensors 245 disposed at the base of the storage containers 232 can detect an increase in weight in response to the robotic device 260 depositing an item in the storage container. The sensors 245 can encode the increase in weight in electrical signals and transmit the electrical signals to the second computing system 202. The second computing system 202 can execute the interfacing engine 222 in response to receiving the electrical signals. The interfacing engine 222 can decode the electrical signals and query the storage container database 227 to determine which products are designated to be deposited in the storage container. The interfacing engine 222 can query the physical object information database 235 to determine the weights of the products designated to be deposited in the storage container 232. The interfacing engine 222 can determine an incorrect physical object was placed in the storage container 232 based on the increase in weight. The interfacing engine 222 can establish an interface with the robotic device 260 and can transmit instructions to the robotic device 260 through the interface to remove the deposited physical object from the storage container 232. The interfacing engine 222 can also transmit instructions to the robotic device through the interface 260 to deposit the physical object in a different storage container 232.

In some embodiments, the second computing system can be a user facing computing system 202 and the interface can be a chatroom between the robotic device 260 and a customer and/or an employee. The chatroom interface may allow and employee or customer to select alternate items. The interfacing engine 222 can execute an automated computerized script which can provide pre-programmed responses by recognizing words in the chatroom. For example, the robotic device 260 can recognize a product name and the term "location." The robotic device 260 in response provide the location of the product in the facility. The second computing system 202 can also establish an interface to the first computing system 200 to control functions such as task management and/or alternate product options.

Figure 3:
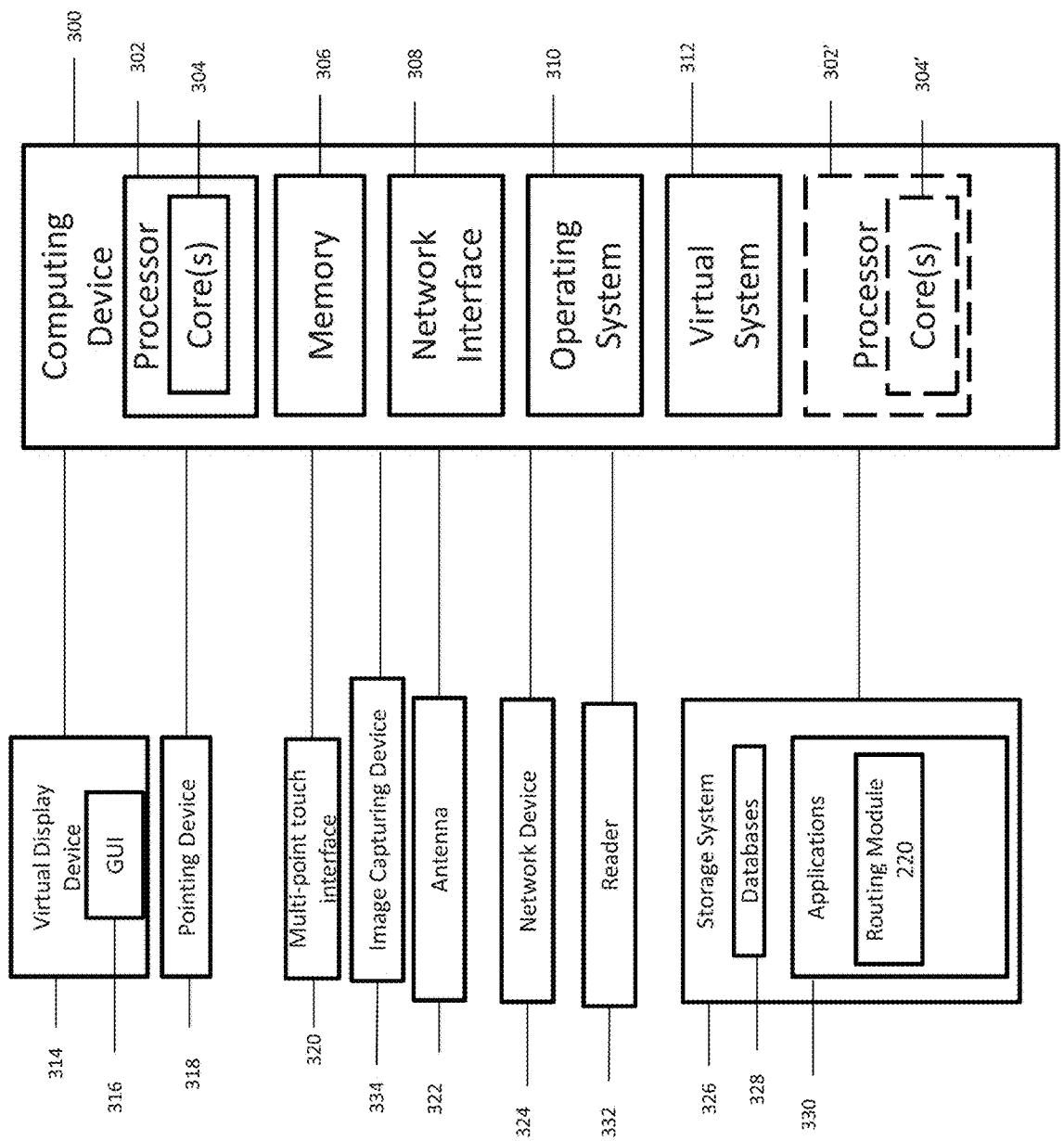
FIG. 3 is a block diagrams illustrating of an exemplary computing device in accordance with an exemplary embodiment.

FIG. 3 is a block diagram of an example computing device for implementing exemplary embodiments of the present disclosure. Embodiments of the computing device 300 can implement embodiments of the routing engine and/or the interfacing engine. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the routing engine 220 and the interfacing engine 222) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320, a pointing device 318, an image capturing device 334 and an reader 332.

The computing device 300 may also include one or more storage devices 326, such as a hard-drive, CD-ROM, or other computer readable media, for storing data and computer-readable instructions and/or software that implement exemplary embodiments of the present disclosure (e.g., applications). For example, exemplary storage device 326 can include one or more databases 328 for storing information associated with physical objects disposed at a facility and can be indexed via the decoded identifier retrieved by the identifier reader, information to associate physical objects with the storage containers within which the physical objects are to be deposited and information about the facility in which the physical objects are disposed. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
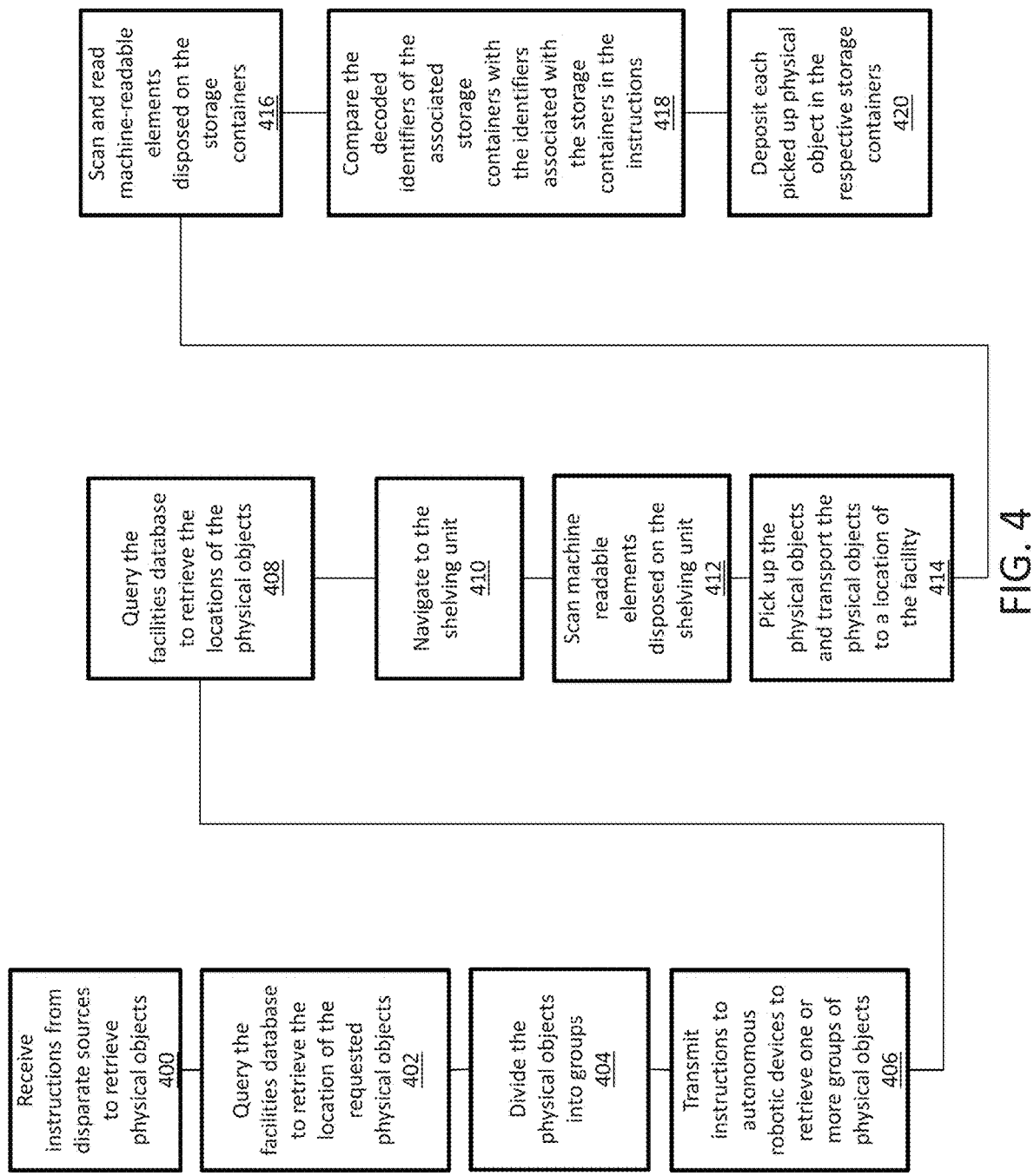
FIG. 4 is a flowchart illustrating an exemplary process of the automatic robotic fulfillment system in accordance with an exemplary embodiment.

FIG. 4 is a flowchart illustrating the process of the automated robotic fulfillment system according to exemplary embodiment. In operation 400, a computing system (e.g. first computing system 200 as shown in FIG. 2) can receive instructions from disparate sources (e.g. disparate sources as shown in FIG. 2) to retrieve physical objects (e.g. physical objects 104-110, 152, 156 and 162 as shown in FIGS. 1A-B) from a facility. The computing system can execute the routing engine (e.g. routing engine 220 as shown in FIG. 2) in response to receiving the instructions. In operation 402, the routing engine can query the facilities database (e.g., the facilities database 225) to retrieve the location of the requested physical objects. The routing engine can query the physical objects database (as physical objects database 235 as shown in FIG. 2) to retrieve a set of attributes associated with the requested physical objects. In operation 404, the routing engine can divide the requested physical objects into groups based on the location and/or set of attributes associated with the physical objects.

In operation 406, the routing engine can transmit instructions to various autonomous robotic devices (e.g. autonomous robotic devices 120, 150 and 260 as shown in FIGS. 1A-B and 2) disposed in a facility to retrieve one or more groups of physical objects and deposit the physical objects in one or more storage containers (e.g. storage containers 154, 164 and 232 as shown in FIGS. 1B and 2). The instructions can include the identifiers associated with the physical objects and identifiers associated with the storage containers in which to deposit the physical objects. In operation 408, the autonomous robot device can query the facilities database to retrieve the locations of the physical objects within the facility. In operation 410, the autonomous robot device can navigate to the shelving unit (e.g. shelving unit 102 and 230 as shown in FIGS. 1A and 2) in which the physical objects are disposed. In operation 412, the autonomous robot device can scan machine readable elements disposed on the shelving unit, encoded with identifiers associated with the requested physical objects. The autonomous robot device can query the physical objects database using the identifiers to retrieve a set of stored attributes associated with the physical objects. The autonomous robot device can capture an image of the physical objects and extract a set of attributes associated with the physical objects the image. The autonomous robot device can compare the stored set of attributes associated with the physical objects and the extracted set of attributes associated with the physical objects to confirm the physical objects disposed on the shelf is the same physical object the autonomous robot device was instructed to pick up.

In operation 414, the autonomous robot device can pick up the physical objects and transport the physical objects to a location of the facility including storage containers. In operation 416, the autonomous robot device can scan and read machine-readable elements (e.g. machine-readable elements 166 168 as shown in FIG. 1B) disposed on the storage containers. The machine readable elements can be encoded with identifiers associated with the storage containers. In operation 418, the autonomous robot device can compare the decoded identifiers of the associated storage containers with the identifiers associated with the storage containers in the instructions. The autonomous robot device can determine which physical objects among the physical objects the autonomous robot device has picked up, are associated with which storage containers. In operation 420, the autonomous robot device can deposit each picked up physical object in the respective storage containers.

Figure 5:
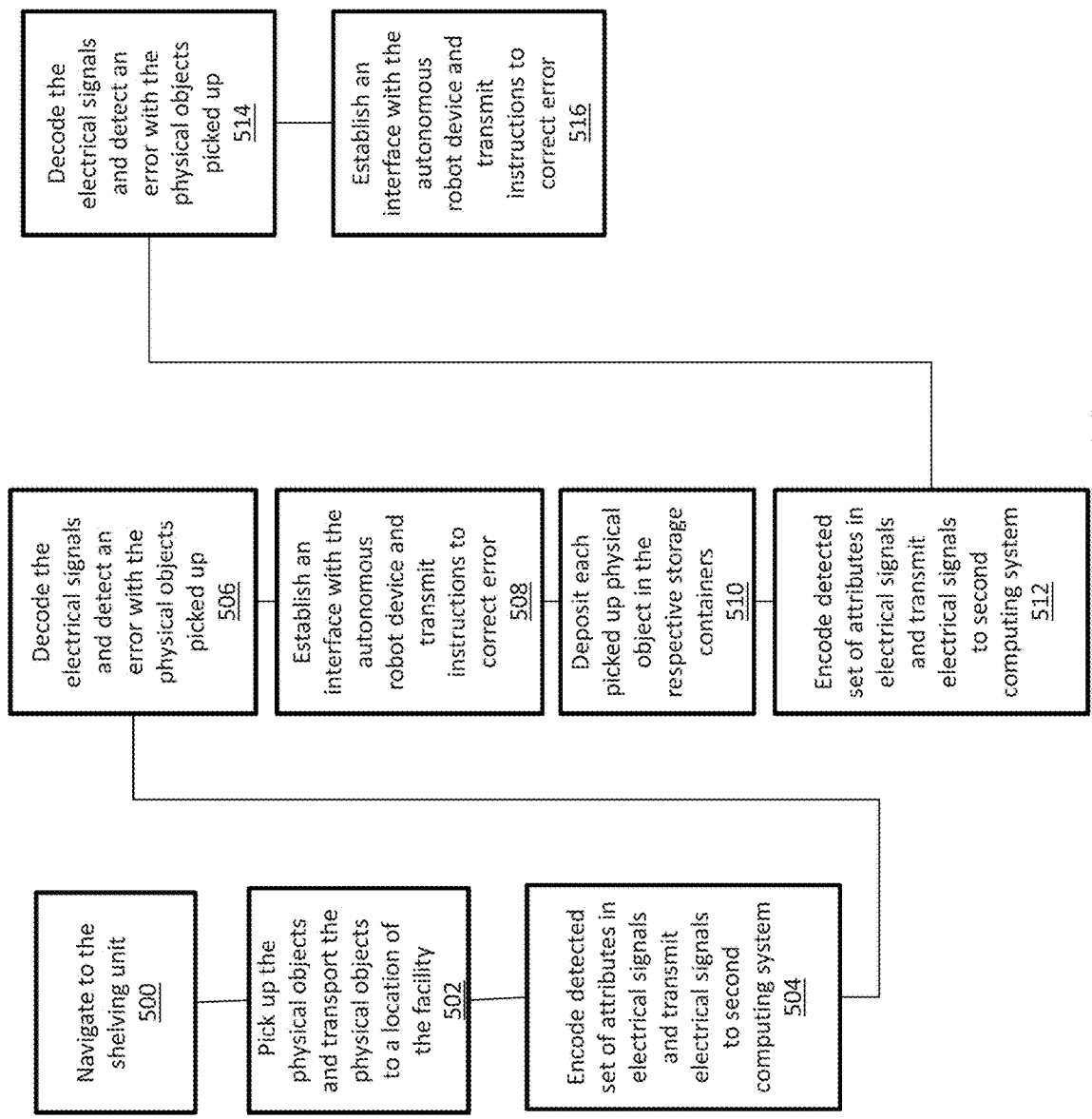
FIG. 5 is a flowchart illustrating the process of the automated robotic interfacing system according to exemplary embodiment.

FIG. 5 is a flowchart illustrating the process of the automated robotic interfacing system according to exemplary embodiment. In operation 500, in response to instructions from a first computing system (e.g. first computing system 200 as shown in FIG. 2), an autonomous robot device (e.g. autonomous robotic devices 120, 150 and 260 as shown in FIGS. 1A-B and 2) can navigate to the shelving unit (e.g. shelving unit 102 as shown in FIG. 1A) in which physical objects (e.g. physical objects 104-110, 152, 156 and 162 as shown in FIGS. 1A-B) are disposed, to pick up a first quantity of physical objects.

In operation 502, the autonomous robot device can pick up the physical objects and transport the physical objects to a location of the facility including storage containers. Sensors (e.g. sensors 142, 188 and 245 as shown in FIGS. 1A 1C and 2) can be disposed at the shelving unit in which the physical objects are disposed. The sensors can detect a change in weight, temperature or moisture in response to the physical objects being picked up by the autonomous robot device. In operation 504, in response to the physical objects being picked up, the sensors can encode a detected set of attributes into electrical signals and transmit the electrical signals to the second computing system (e.g. second computing system 202 as shown in FIG. 2). The second computing system can execute the interfacing engine (e.g. interfacing engine 222 as shown in FIG. 2) in response to receiving the electrical signals. In operation 506, interfacing engine can decode the electrical signals and detect an error with the physical objects picked up by the autonomous robot device based on the set of attributes decoded from the electrical signals. In operation 508, the interfacing engine establish an interface with the autonomous robot device. The interfacing engine can instruct the autonomous robot device through the interface to correct the error with the physical objects that were picked up by the autonomous robot device.

In operation 510, the autonomous robot device can deposit each picked up physical object in the respective storage containers. Sensors (e.g. sensors 158 160 176 and 245 as shown in FIGS. 1B-1C and 2) can be disposed in the storage containers. The sensors can detect a change in weight, temperature and/or moisture in response to the autonomous robot device depositing the physical objects in the storage containers. In operation 512, in response to the physical objects being deposited, the sensors can encode a detected set of attributes into electrical signals and transmit the electrical signals to the second computing system. The second computing system can execute the interfacing engine in response to receiving the electrical signals. In operation 514, interfacing engine can decode the electrical signals and detect an error with the physical objects deposited in the storage containers by the autonomous robot device based on the set of attributes decoded from the electrical signals. In operation 516, the interfacing engine can establish an interface with the autonomous robot device. The interfacing engine can instruct the autonomous robot device through the interface to correct the correct the error with the physical objects that were deposited by the autonomous robot device.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. An autonomous system comprising:
a first computing system in selective communication with a plurality of robot devices each configured to navigate through a facility, wherein the first computing system being configured to assign tasks to each of the plurality of robot devices in response to requests from one or more user devices, the first computing system configured to:
receive the requests from disparate sources for physical objects disposed at one or more locations in the facility;
query a database in response to receiving the requests and determine a first set of object locations of the physical objects based on results from the query;
assign respective tasks to two or more robot devices, of the plurality of robot devices, to each retrieve at least one of the physical objects;
receive sensor data from one or more sensors, wherein the sensor data comprises data corresponding to operations being performed by at least a first robot device of the two or more robot devices including detection sensor data regarding detecting the first robot device has pass a respective location within the facility; and
confirm a route of the first robot device based on the sensor data received from at least one of the one or more sensors as the first robot device retrieves a first physical object, of the at least one of the physical objects, assigned to the first robot device; and
a second computing system in communication with the first computing system and the one or more sensors, the second computing system programmed to:
confirm an error in at least one of the operations being performed by the first robot device of the plurality of robot devices based on the sensor data and a current task being performed by the first robot device; and
establish an interface between the second computing system and the first robot device in response to the confirmation of the error, wherein the interface is configured to enable communication of a correction instruction to the first robot device.

2. The system of claim 1, wherein the first computing system, in the assigning the respective tasks to the two or more robot devices, is configured to assign a first task comprising transporting a storage container, in which is positioned the first physical object, from a first location within the facility to a second location within the facility.

3. The system of claim 2, wherein at least one of the one or more sensors are disposed proximate the storage container and are configured to detect a set of attributes associated with the first physical object deposited in the storage container, wherein the set of attributes are encoded in an electrical signal and wirelessly received by the second computing system.

4. The system of claim 3, wherein the second computing system, in confirming the error, is configured to receive the electrical signal, decode the set of attributes and confirm the error in the at least one of the operations being performed by the first robot device based on the set of attributes.

5. The system of claim 1, wherein the one or more sensors comprises an additional subset of sensors positioned on a shelving unit within the facility;
wherein the second computing system is further configured to:
detect an additional error associated with a first operation being performed by at least the first robot device based on additional sensor data from one or more of the additional subset of sensors and the respective task being performed by the first robot device; and
communicate an instruction controlling the first robot device to alter the first operation in response to detecting the additional error in the first operation being performed by the first robot device.

6. The system of claim 1, wherein the error is one or more of: at least one incorrect physical object within at least one storage container retrieved by the first robot device, and incorrect quantity of at least one of the physical objects within a first storage container.

7. The system of claim 6, wherein the second computing system is further programmed to:
control the first robot device of the plurality of robot devices to perform a first operation in response to detecting the error in modifying the operations being performed by the first robot device.

8. The system of claim 7, wherein the second computing system controlling the first robot device, is configured to communicate an instruction used in navigation of the first robot device through at least a portion of the facility.

9. The system of claim 1, further comprising:
a subset of additional sensors remote from the plurality of robot devices and positioned proximate a shelving unit in the facility, wherein the subset of additional sensors are configured to detect a change in products placed on the shelving unit; and
wherein the second computing system is further configured to detect an additional error in the operations being performed by one or more of the plurality of robot devices based on an output of one or more of the subset of additional sensors.

10. The system of claim 1, further comprising:
a subset of additional sensors separate from the plurality of robot devices and positioned within the facility, wherein each sensor of the subset of additional sensors is configured to detect one or more of the plurality of robot devices proximate a respective one of the subset of additional sensors; and
wherein the second computing system in the confirming the error is configured to confirm the error based on a detected robot location of the first robot device determined based on additional sensor data from at least a first additional sensor of the subset of additional sensors as the first robot device moves through the facility.

11. A method comprising:
receiving requests from disparate sources for physical objects disposed at one or more locations in a facility;
assigning, via a first computing system in selective communication with a plurality of robot devices each configured to navigate through a facility, tasks to each of the plurality of robot devices in response to the requests from one or more user devices, the tasks being assigned by the first computing system in response to receiving the requests;
querying a database in response to receiving the requests and determining a first set of object locations of the physical objects based on results from the query;
assigning respective tasks to two or more robot devices, of the plurality of robot devices, to each retrieve at least one of the physical objects;
receiving sensor data from one or more sensors, wherein the sensor data comprises data corresponding to operations being performed by at least a first robot device of the two or more robot devices including sensor data regarding detecting the first robot device has pass a respective detection location within the facility;
confirming a route of the first robot device based on the sensor data received from at least one of the one or more sensors as the first robot device retrieves a first physical object assigned to the first robot device;
confirming, via a second computing system in communication with the one or more sensors, an error in at least one of the operations being performed by the first robot device based on the sensor data and a current task being performed by the first robot device; and
establishing, via the second computing system, an interface between the second computing system and the first robot device in response to the confirming of the error, wherein the interface is configured to enable communication of a correction instruction to the first robot device.

12. The method of claim 11, wherein the assigning the respective tasks to the two or more robot devices comprises assigning a first task comprising transporting a storage container, in which is positioned the first physical object, from a first location within the facility to a second location within the facility.

13. The method of claim 12, further comprising:
detecting, via at least one of the one or more sensors, a set of attributes associated with the first physical object deposited in the storage container; and
wirelessly receiving, by the second computing system, an electrical signal, wherein the set of attributes are encoded in the electrical signal.

14. The method of claim 13, further comprising:
decoding, via the second computing system, the set of attributes from the electrical signal; and
wherein the confirming the error comprises confirming, via the second computing system, the error in the at least one of the operations being performed by the first robot device based on the set of attributes.

15. The method of claim 11, further comprising:
detecting, by the second computing system, an additional error associated with a first operation being performed by at least the first robot device based on additional sensor data from one or more additional sensors of an additional subset of sensors remote to the plurality of robot devices; and
communicating an instruction controlling the first robot device to alter the first operation of the first robot device in response to detecting the additional error in the first operation being performed by the first robot device.

16. The method of claim 11, wherein the error is one or more of: an incorrect physical object within at least one storage container retrieved by the first robot device, and incorrect quantity of at least one of the physical objects within a first storage container.

17. The method of claim 16, further comprising controlling, via the second computing system, first robot device of the plurality of robot devices to perform a first operation in response to detecting the error in modifying the operations being performed by the first robot device.

18. The method of claim 17, wherein the controlling the first robot device further comprises: communicating an instruction used in navigation of the first robot device through at least a portion of the facility.

19. The method of claim 11, further comprising:
receiving, at the second computing system from a subset of additional sensors separate from the plurality of robot devices and positioned within the facility, additional sensor data detected based on one or more of the plurality of robot devices being proximate a respective one of the subset of additional sensors;
wherein the confirming the error comprises confirming the error based on a detected robot location of the first robot device determined based on the additional sensor data from at least a first additional sensor of the subset of additional sensors as the first robot device moves through the facility.

* * * * *